United States Patent [19]

Sikora

[11] Patent Number: 5,214,376
[45] Date of Patent: May 25, 1993

[54] DEVICE FOR ESTABLISHING THE POSITION OF A CONDUCTOR OF AN ENVELOPED CABLE HAVING PROXIMITY SENSOR AND A YIELDABLY SUPPORTED ROLLER DRIVEN BY THE CABLE

[75] Inventor: Harald Sikora, Bremen, Fed. Rep. of Germany

[73] Assignee: Sikora Industrieelektronik GmbH, Bremen, Fed. Rep. of Germany

[21] Appl. No.: 700,708

[22] Filed: May 15, 1991

[30] Foreign Application Priority Data

May 16, 1990 [DE] Fed. Rep. of Germany ....... 4015692

[51] Int. Cl.$^5$ ............... G01B 7/14; G01B 7/10; B29C 47/92
[52] U.S. Cl. .............. 324/207.15; 264/40.1; 324/230; 324/262; 324/263; 425/169
[58] Field of Search ............... 324/207.15, 207.16, 324/207.22, 207.25, 207.26, 226, 229.231, 262, 263, 515; 340/677; 73/159, 160; 264/40.1; 425/141, 169, 194.6, 174.8 R

[56] References Cited

U.S. PATENT DOCUMENTS

| | | | |
|---|---|---|---|
| 2,703,384 | 3/1955 | Rendel | 324/230 |
| 3,323,701 | 6/1967 | Gurski et al. | 324/515 X |
| 3,355,664 | 11/1967 | Pranke | 324/515 X |
| 3,760,264 | 9/1973 | Zumbach | 324/230 |
| 3,866,115 | 2/1975 | Lewis | 324/231 |
| 4,053,827 | 10/1977 | Millette et al. | 324/230 |
| 4,665,361 | 5/1987 | Dorsch et al. | 324/226 X |
| 4,682,105 | 7/1987 | Thorn | 324/230 |
| 4,700,486 | 10/1987 | Puumalainen | 324/231 X |
| 4,767,987 | 8/1988 | Montgomery | 324/231 |

FOREIGN PATENT DOCUMENTS

| | | |
|---|---|---|
| 2517709 | 11/1978 | Fed. Rep. of Germany. |
| 8018312.6 | 1/1984 | Fed. Rep. of Germany. |
| 3403956 | 8/1985 | Fed. Rep. of Germany. |
| 0115304 | 7/1983 | Japan ................. 324/230 |
| 0206402 | 9/1987 | Japan ................. 324/231 |

*Primary Examiner*—Gerard R. Strecker
*Attorney, Agent, or Firm*—Kinney & Lange

[57] ABSTRACT

A device for measuring the position of a conductor in an enveloped cable, preferably directly after extruding the plastic envelope, in which at least a supporting means for a sensor is continuously engaging the periphery of the envelope and in which the sensor determines the distance between the conductor and the sensor, and wherein the output signal of the sensor is delivered to a processing and displaying means, wherein the supporting means is defined by a roller driven by the cable which roller is yieldingly supported normal to the rotational axis.

10 Claims, 4 Drawing Sheets

DEVICE FOR ESTABLISHING THE POSITION OF A CONDUCTOR OF AN ENVELOPED CABLE HAVING PROXIMITY SENSOR AND A YIELDABLY SUPPORTED ROLLER DRIVEN BY THE CABLE

BACKGROUND OF THE INVENTION

The invention refers to a device for measuring the position of a conductor in an enveloped cable.

In making cables the envelope is regularly extruded onto the conductor. The thickness of the envelope should have a predetermined dimension, to obtain proper insulation for example. Optical devices are provided to control the thickness or, respectively the diameter of the cable. A light source emitting light in a direction normal to the cable direction generates a shadow on a receiving device, for example on lines of diodes which is a measure for the diameter. When the diameter is not within the desired value, the speed of the extruder screw or the absolute speed of the conductor is adjusted until the desired value is obtained.

With a view to minimum material consumption, a smallest possible diameter is adjusted. However, when the conductor in the cable envelope is eccentrically offset, the desired wall thickness may fall short and the necessary insulation is not obtained anymore. Accordingly the eccentricity of the conductor should be controlled. When the eccentricity is measured at the end of the enveloping station, the correction by adjusting the extruder tools is relatively late; this means that a relatively long length of cable has an eccentricity out of allowance.

U.S. Pat. No. 4,086,044 discloses induction measuring means to determine the eccentricity. By means of inductive sensors the position of the conductor relative to the sensors is determined. The sensors are sensitive to the magnetic field for example which is generated by a current impressed in the conductor. The position of the cable envelope is determined by means of optical devices. In this way the wall thickness of the envelope is measured or calculated. However, the measurement of the eccentricity by means of inductive sensors including coils can hardly be performed in a pressure tube provided for plastic interlacing. In particular, an expensive temperature compensation is necessary to obtain approximately accurate dimensions.

The method referred to teaches a contactless measurement of the eccentricity. Moreover, methods of the engaging type are known as well. According to an embodiment of the known method a supporting member for a sensor contacts the cable envelope. The sensor includes an oscillator which dampening varies according to the distance of the conductor. It is further known to engage the cable with a pair of opposite plates of electrically conductive material to measure the capacity between the conductor and the plates, wherein a capacity difference different from zero indicates an eccentricity.

Both methods of the prior art exhibit substantial disadvantages. The supporting member or, respectively the electrically conducting plates are stationarily mounted, while the cable passing speed is substantial. For example, cables of small diameters pass through the extruder with a speed up to 2000 m/min. Accordingly, there is a substantial friction wear on the measuring head. Furthermore, there is a substantial contamination which is detrimental to the measuring accuracy. A further disadvantage of the known methods is the condition that each different diameter of the cable needs a new calibration. Still further, the known methods can be applied to the cable envelope only when fully cooled down. The method of measuring the capacitance has a further disadvantage that it suffers or becomes impossible when the envelope surface becomes hot in a humid environment.

SUMMARY OF THE INVENTION

The object of the present invention is to provide a device for measuring the position of a conductor in a cable envelope, preferably directly after the extrusion process which device operates with less wear although it is in continuously engagement with the cable envelope and which device allows a high measuring accuracy.

According to the invention, the supporting member for the sensor is defined by a roller driven by the cable. The roller is yieldingly supported and is biased into continuous contact with the cable envelope by means of a spring for example, or a similar device, thus independent of the diameter of the cable produced. The sensor associated with the roller can be stationarily mounted relative to the roller according to an embodiment of the invention. For example, the roller can be mounted rotatably on a rigid axis at the sensor is supported by a supporting arm at the axis at a relatively small distance with respect to the periphery of the roller. The distance of the sensor from the cable envelope is thus constant and the output signal of the sensor represents a measure for the distance between the conductor and the sensor. The processing and displaying means compares the measured value with a desired value and generates a display signal when a difference occurs. The sign of the difference indicates whether the distance is too large or too small.

According to an alternative embodiment of the invention the sensor can rotate with the roller. Accordingly the output signal of the sensor varies periodically and must be made dependent on the rotational position of the roller. For example, the minimum or the maximum value of the output signal can be used to define the distance between the sensor and the conductor. A rotating sensor, however, requires a more expensive transmittance of the output signal to the stationary processing and displaying means using slip rings for example.

Although the distance of the sensor from the cable surface is maintained constant according to the invention, the wear due to the rotating roller carrying the sensor is at a minimum. Contaminations are less important and may be easily removed. The device according to the invention even allows measurements to be taken when the material of the envelope is still relatively warm as the engaging pressure of the roller on the cable can be selected such that the roller is rotated without any slip or without substantial slip.

Different embodiments are proper for the sensors. According to an embodiment, there is provided an inductive sensor which is activated by the magnetic field which is generated by a current flowing in the conductor. By means of a current source the current is generated in the conductor for example in an inductive or capacitive manner or by a direct connection with the bare conductor. The current may have a high or a higher frequency and induces a voltage in the sensor which intensity depends on the distance between the sensor and the conductor. When an inductive sensor of the proximity sensor type is used, there is no need to generate a current in the conductor. The dampening of the electromagnetic oscillator circuit depends on the distance between the conductor and the proximity sensor. The frequency variation due to a different dampening is thus a measure for the said distance. The processing and displaying means performs thus a corresponding processing.

Alternatively, a capacitive sensor may be used which field is activated by an electrical field which is generated by a current flowing in the conductor. This means that the roller defining the supporting member for the sensor must be made of an electrically non-conductive material to prevent an interference with the electromagnetic or electrostatic field.

A third embodiment to determine the distance of the sensor from the conductor is to provide a transmitter of measuring waves as well as a receiver receiving the reflection of the measuring waves from the conductor. The processing and displaying means includes a propagation time measuring means to calculate the distance of the sensor from the conductor. The transmitter and receiver may operate with ultrasonic waves for example, wherein according to a further embodiment of the invention the transmitter, the receiver as well as the cable are provided in a coupling liquid to improve the energy transfer. It should be understood that different measuring waves may be used for measuring the propagation time, such as electromagnetic or other longitudinal waves for example.

A third alternative embodiment of the sensor is to form the roller as a ring of electrically conducting material in which a current is induced by an impressed current in the conductor, wherein the ring is enclosed by a stationary coil or cooperates therewith, in which coil a voltage is induced as a function of the current in the ring. The current induced in the conductive ring is dependent on the intensity of the impressed current of the conductor and the distance of the ring from the conductor. The current induced in the conductive ring is electromagnetically decoupled and the voltage induced in the coil is thus a measure for the distance of the conductor. The ring can be mounted on an axis, or supporting rollers can be provided to bias the ring yieldingly towards the surface of the cable.

When a single sensor at a single roller is used, the eccentricity may be determined only along a line. To provide a more accurate eccentricity measurement, it is appropriate to engage the cable with a plurality of rollers each including at least a sensor. Thus a number of rollers can be disposed star-like around the periphery of the cable. To eliminate an individual processing and displaying means for each single roller, a multiplexer may be provided to supply the output signals of the sensors subsequently to the processing circuit. According to a further embodiment of the invention at least a pair of opposite rollers each including at least a sensor is provided the signals of which are compared with each other. When the difference of the output signal equals zero the eccentricity is zero. When the difference is not zero, the sign of the difference indicates to which side the conductor in the envelope is displaced. According to a further embodiment of the invention an amplifier circuit is provided to control the output signals of the sensors to a constant gain to allow a calibration of the differential signal in units of length, in order to directly display the eccentricity in millimeters, for example.

In particular for cables with smaller diameters a more or less considerable rotation of the cable about its longitudinal axis occurs which rotation may be oscillating after the extruding process. As the extruder tools are stationary, it is important to determine the peripheral position of the eccentricity measured. According to an embodiment of the invention, a rotational measuring means measures the rotation of the cable about its longitudinal axis and the output signal of the rotational measuring means is delivered to the processing and displaying means to calculate the position of the conductor in response to the rotational position of the cable. For example, the rotational measuring means may be provided by a cylindrical roller which is moveably supported along its longitudinal axis being disposed normal to the cable axis. A path transducer measures the displacement of the cylindrical roller with respect to a zero position, wherein the displacement is a measure for the rotation of the cable.

As mentioned before, a single roller and a single sensor may measure the eccentricity along a line only. Rotating the cable allows a measurement along a helical line, whereby measuring the position of the conductor in the envelope is improved. However, the occurrence of the cable rotation is arbitrary and cannot be used to really improve the measuring process. An embodiment of the invention rather provides for engaging the cable with at least a cylindrical roller which axis is normal to the cable axis. The cylindrical roller is connected to a drive means for periodically reciprocating the roller. When a pair of opposite cylindrical rollers is used, the cable can be cyclically rotated. In this manner the eccentricity may be helically measured around the complete periphery of the cable. A rotation of the cable relative to the roller comprising the sensor results in a friction on the roller. Even for very high feeding speeds of the cable the relative peripheral speed in the direction of the friction is relatively small and can be neglected.

BRIEF DESCRIPTION OF THE DRAWINGS

The invention is now described in detail referring to the drawings.

DETAILED DESCRIPTION OF THE PREFERRED EMBODIMENTS

Figure 1:
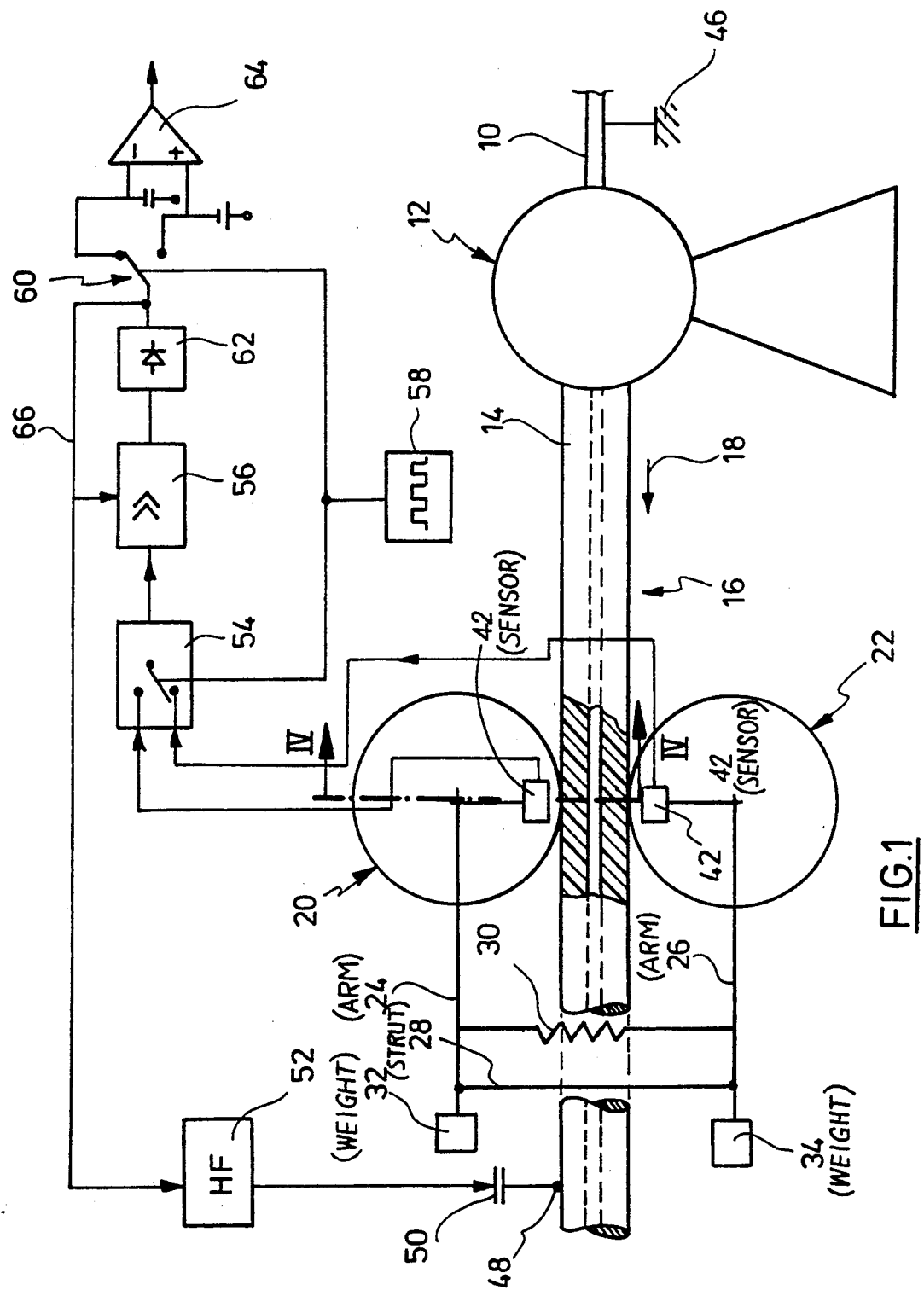
FIG. 1 schematically shows a device according to the invention.

A cord 10 such as a single wire, a strand, a braided cord or the like is coated with an envelope 14 in an extruder 12 in a manner not shown in detail. The cable 16 thus formed is withdrawn in the direction of the arrow 18 at a predetermined speed and is subsequently cooled down in a cooling station before winding up on a roller. It is of course desired to extrude the envelope 14 onto the conductor 10 such that the conductor 10 is concentrically located within the envelope 14 and that the thickness of the envelope has a predetermined dimension. The thickness of the coating or, respectively the diameter thereof is controlled by means of an optical measuring device for example. When there is a deviation from the desired dimension, the withdrawal speed and/or the feed speed of the extruder screw is varied. The device shown determines the relative position of the conductor within the envelope which is not continuously concentrical even when the extruder tools are properly adjusted.

FIG. 1 shows two rollers 20, 22, the axes thereof extending vertical to the cable axis and the periphery thereof engaging opposite sides of the cable 16. The rollers 20, 22 are rotatably mounted on arms 24 or 26 pivoted to a strut 28. The arms 24, 26 are biased towards each other by a spring 30 to apply a predetermined engaging pressure to the rollers 20, 22. Weights 32 and 34 are mounted on sections of the arms 24, 26 extending beyond the connection of the strut 28. The weights 32, 34 compensate the weight of the rollers 20, 22 and arms 24, 26. The weight compensation may be omitted when the rollers 20, 22 are horizontally disposed.

Figure 4:
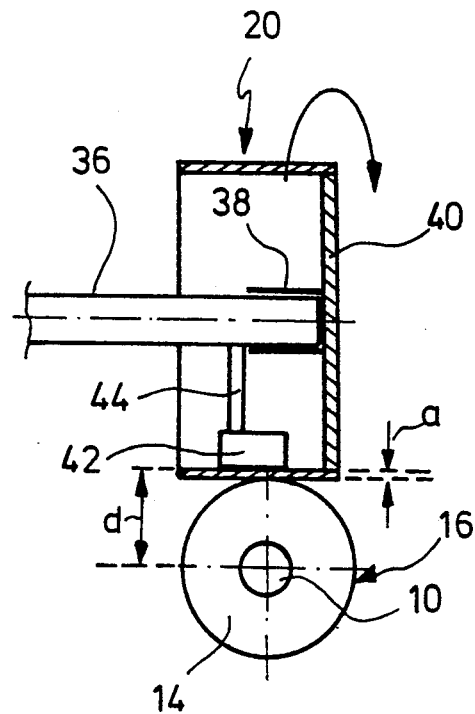
FIG. 4 shows a section through the device of FIG. 1 along line IV—IV.

FIG. 4 shows the structure of the roller 20. A stationary axis 36 connected to a base not shown is disposed in a bearing sleeve 38 attached to the front face 40, the sleeve including roller bearings for example. The hollow roller 20 is rotated by the moving cable 16.

Figure 6:
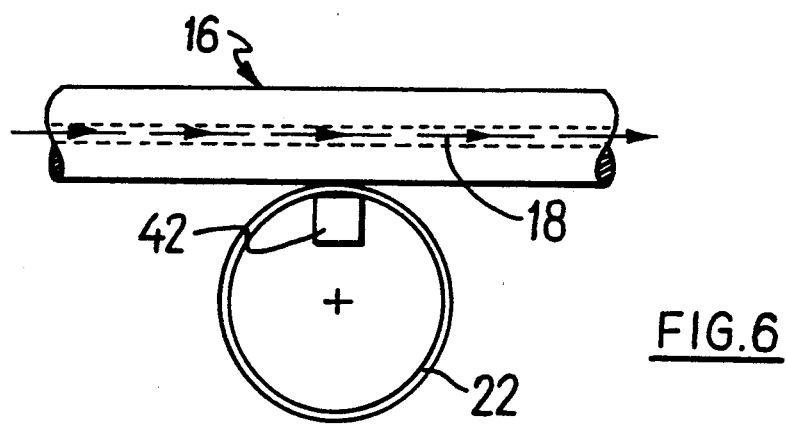
FIG. 6 shows an alternative embodiment of the invention in which the sensor rotates with the roller.

A sensor 42 is fixedly secured on the axis 36 by means of an arm 44. When the roller 20 engages the cable 16, the distance of the sensor 42 from the cable surface is constant. This distance a is shown in FIG. 4. The distance d of the sensor 42 from the axis of the conductor 10 is thus dependent on the thickness of the envelope 14. Alternatively, as seen in FIG. 6, the sensor 42 may be mounted on the inner wall of the hollow roller 20 and thus rotate with the roller 20.

As seen in FIG. 1, the structure of the sensors 42 is not illustrated in detail, for example, they comprise an induction coil for inducing a voltage by applying a high frequency current to the conductor 10 for example. Before feeding to the extruder 12, the conductor 10 is at ground as shown at 46. On or close to the surface of the envelope 14, there is an electrode 48 which is connected through a capacitor 50 to a high frequency generator 52. The high frequency current in the conductor 10 induces a voltage in the coils of the sensors 42. It is appropriate to eliminate the impressed current when the sensors are formed as proximity feelers, the dampening thereof being a function of the distance between the proximity sensor and the conductor 10.

The output signals of both sensors 42 are fed through separate lines to an electronic switch 54 which applies the outputs of the sensors 42 alternatively to an amplifier 56. The switch 54 is controlled by a signal generator 58 controlling a further electronic switch 60 to feed the output of a rectifying circuit 62 connected to the output of the amplifier 56 alternatively to an input of an operational amplifier 64. The amplifier 64 operates as a differential amplifier for the output signals of the sensors 42. When the output signal of the amplifier 64 is zero, the conductor 10 is exactly located in the center between the sensors 42 and is thus concentrical within the cable 16, at least in the plane of the cable 16 defined by the sensors 42. When the output signal of the amplifier 64 is different from zero, its quantity is a value for the deviation of the position of the conductor 10, and its sign indicates the deviation towards one of both sensors.

The output signal of the rectifier circuit 62 is fed back through line 66 to the amplifier 56 and the high frequency generator 52. This results in an automatical gain control allowing to calibrate the output signal of the amplifier 64 as units of length so that the output signal is calibrated in millimeters for example, independent of the thickness of the cable. The display device is not shown. It can be an optical display device for a digital display of the eccentricity.

Figure 2:
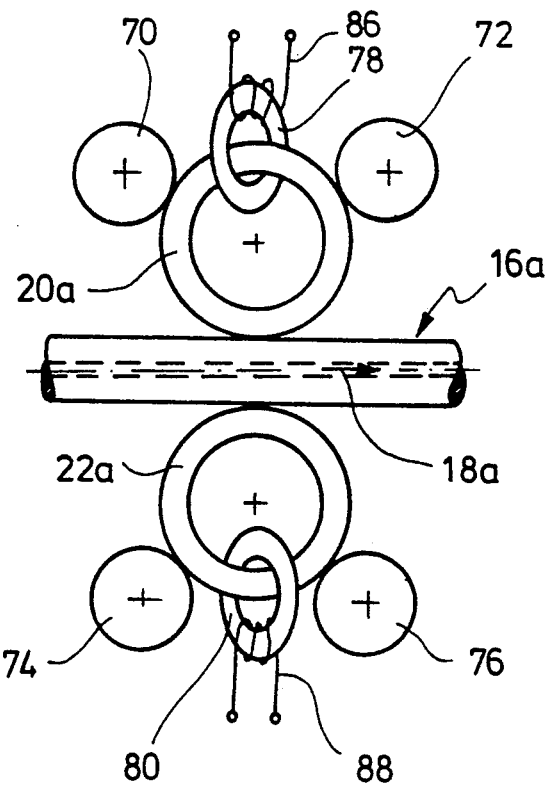
FIG. 2 schematically shows an alternative embodiment for a sensor in the device of FIG. 1.

According to FIG. 2, the cable 16a is forwarded in the direction of the arrow 18a. A pair of rings 20a, 22a of electrically conductive material is in rolling engagement on opposite sides of the cable 16. The rings 20a, 22a are held against the surface of the cable 16 by means of supporting rollers pairs 70, 72 or 74, 76. The rollers 70 to 76 are resiliently supported such that the rings 20a, 22a can yield when the diameter of the cable 16 changes. Annular cores 78, 80 pass through the rings 20a, 22a which cores bear coils 86, 88 externally of the rings 20a, 22a. An alternating current is impressed in the conductor of the cable 16 in the manner above referred to or in any other manner, the field thereof inducing a current in the rings 20a, 22a. The intensity of the current depends on the current intensity in the conductor as well as on the distance between the rings 20a, 22a and the conductor. The voltage induced in the coils 86, 88 thus is a measure for the distance between the rings 20a, 22 and the conductor. The voltage can be supplied to a circuitry as described in connection with FIG. 1.

When the rings 20a, 22a are rotatably supported by means of axes, U-shaped open cores are provided to measure the current induced in the rings 20a, 22a.

Figure 3:
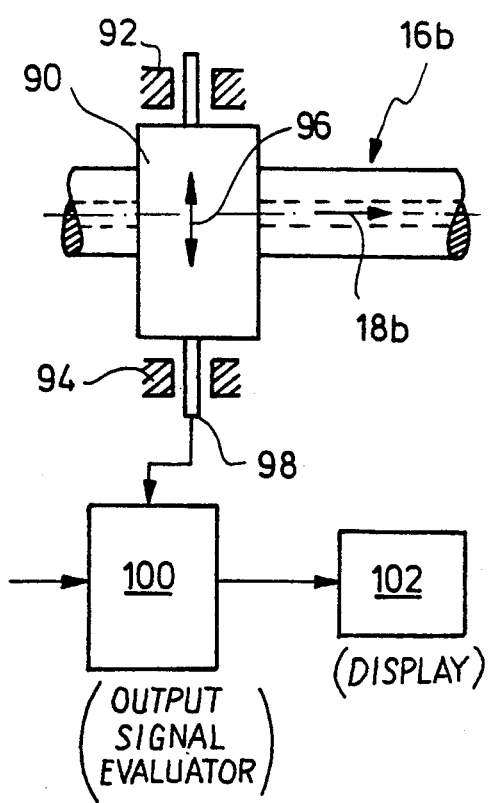
FIG. 3 schematically shows a device for a rotational measurement of the cable for a device of FIG. 1.

FIG. 3 shows a cable 16b passing in the direction of the arrow 18b. A cylindrical roller 90 which axis extends vertical to the cable axis is slidingly and rotatably supported in bearings 92, 94. The sliding motion is indicated by the double arrow 96. When the cable 16 is simply fed forward, the roller 90 is rotated. However, when the cable 16b undergoes a rotation the cylindrical roller 90 is displaced correspondingly. The displacement schematically indicated at 98 is measured and delivered to an evaluating device 100. The device 100 comprises the output signal of the differential amplifier 64 of FIG. 1, for example. The device 100 is connected to a display device 102 not shown in detail. The eccentricity is thus measured by a measuring device according to the additional means shown in FIG. 3 dependent on the rotational position of the cable 16b.

Figure 5:
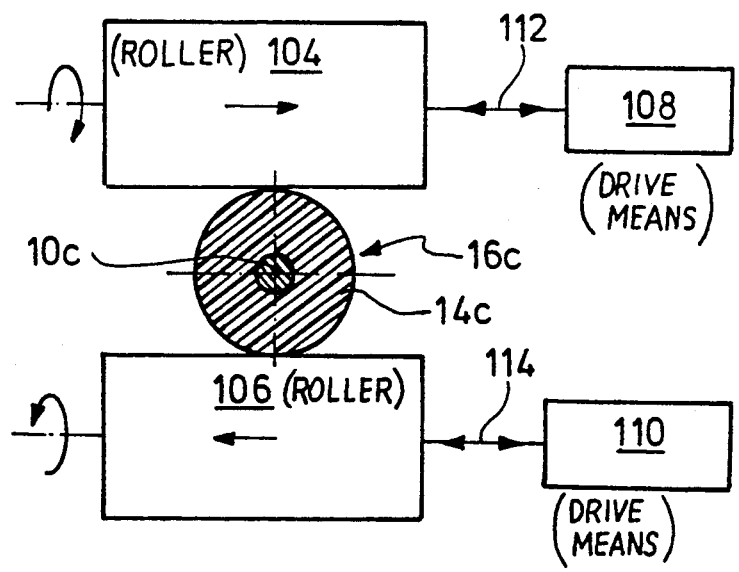
FIG. 5 schematically shows a rotational device for the rotation of a cable to be measured.

FIG. 5 shows a cable 16c comprising an envelope 14c and a conductor 10c. The cable 16c passes vertical to the plane of the drawing. Cylindrical rollers 104, 106 are disposed diameterically to opposite sides, the axis of the rollers extending vertical to the cable axis. The cylindrical rollers 104, 106 rotate when the cable 16c is fed forward. The rollers are connected to drive means 108, 110 performing a reciprocating motion of the rollers 104, 106 along their length axis as indicated by the double arrows 112 and 114. The cable 16c thus undergoes a defined rotation such that the sensors of FIG. 1 for example can measure the eccentricity helically across the periphery of the cable and not only along a straight line. It is thus not necessary to provide more than two sensors shown in FIG. 1 star-like around the periphery of the cable in order to improve measuring accuracy.

I claim:

1. A device for measuring the position of a conductor of a cable having a plastic cable envelope extruded onto the moving conductor, comprising:
   a sensor adapted to generate an output signal in response to the proximity of the conductor with the magnitude of the output signal being dependent upon the distance between the sensor and the conductor;
and
roller means having a roller rotatably mounted thereon and yieldingly supporting the roller in a direction normal to a rotational axis of the roller, the roller continuously engaging a periphery of the envelope and being driven by the cable, and the roller means further comprising means supporting the sensor within an interior of the periphery of the roller for maintaining a fixed distance between the sensor and a periphery of the roller, wherein the sensor output signal indicates the distance of the conductor from the sensor.

2. The device of claim 1 wherein the sensor rotates with the roller.

3. The device of claim 2, and further comprising a processing and displaying means for receiving the output signal of the sensor wherein the processing and displaying means processes the output signal of the sensor dependent upon the rotational position of the roller and wherein the processing and displaying means processes the minimum or, respectively the maximum of the output signal.

4. The device of claim 1, wherein the sensor is stationarily disposed relative to the roller 20, 22.

5. The device of claim 1, wherein the sensor is an inductive sensor which is activated by the magnetic field which is generated by a current flowing in the conductor.

6. The device of claim 2 wherein the means supporting the sensor comprises:
an inner wall of the roller on which the sensor is fixed.

7. The device of claim 4 wherein the means supporting the sensor comprises:
an arm extending perpendicularly from an axis arm about which the roller rotates, the arm supporting the sensor adjacent to and within an interior of the periphery of the roller.

8. The device of claim 1, wherein at least a pair of rollers each including at least a sensor is provided.

9. The device of claim 8, further including processing and displaying means which comprises an amplifier circuit to control the output signals of the sensors for a constant gain, as well as a differential circuit to generate the difference of said output signals.

10. A device for measuring the position of a conductor of a cable having a plastic cable envelope extruded onto the conductor comprising:
a sensor adapted to generate an output signal in response to the proximity of the conductor with the magnitude of the output signal being dependent upon the distance between the sensor and the conductor, the sensor further comprising;
a roller and means for yieldingly supporting the roller in a direction normal to a rotational axis of the roller, the roller continuously engaging a periphery of the envelope and being driven by the cable, and the roller being made of electrically conductive material in which roller a current is induced because of a current impressed in the conductor, the roller cooperating with a magnetic core of a stationary coil to induce in the core a voltage dependent on the current in the roller with the voltage providing the sensor output signal indicating the distance of the conductor from the sensor.

* * * * *